(12) United States Patent
Xuan

(10) Patent No.: US 11,418,543 B2
(45) Date of Patent: Aug. 16, 2022

(54) AUTOMATED IDENTIFICATION OF SECURITY ISSUES

(71) Applicant: VMware, Inc., Palo Alto, CA (US)

(72) Inventor: Chaoting Xuan, Duluth, GA (US)

(73) Assignee: VMWARE, INC., Palo Alto, CA (US)

(*) Notice: Subject to any disclaimer, the term of this patent is extended or adjusted under 35 U.S.C. 154(b) by 300 days.

(21) Appl. No.: 16/431,821

(22) Filed: Jun. 5, 2019

(65) Prior Publication Data

US 2020/0389496 A1 Dec. 10, 2020

(51) Int. Cl.
  *H04L 29/06* (2006.01)
  *H04L 9/40* (2022.01)
  *G06N 20/00* (2019.01)

(52) U.S. Cl.
  CPC .......... *H04L 63/20* (2013.01); *G06N 20/00* (2019.01); *H04L 63/10* (2013.01); *H04L 63/1441* (2013.01)

(58) Field of Classification Search
  CPC ..... H04L 63/20; H04L 63/10; H04L 63/1441; H04L 63/107; H04L 63/145; G06N 20/20
  USPC .............................................. 726/23
  See application file for complete search history.

(56) References Cited

U.S. PATENT DOCUMENTS

| | | | | |
|---|---|---|---|---|
| 9,083,677 B1* | 7/2015 | Yu | ........ | H04L 63/0861 |
| 9,224,096 B2* | 12/2015 | Oppenheimer | .......... | G06N 5/02 |
| 9,967,285 B1* | 5/2018 | Rossman | ................ | G06F 16/22 |
| 10,303,877 B2* | 5/2019 | Roguine | ............... | G06F 21/577 |

\* cited by examiner

*Primary Examiner* — Longbit Chai
(74) *Attorney, Agent, or Firm* — Thomas Horstemeyer, LLP

(57) ABSTRACT

Disclosed are various approaches for automating the detection and identification of security issues. A plurality of signals received from a plurality of security devices are analyzed to identify a predicted security incident, each of the plurality of signals indicating a potential security issue. A confidence score is then calculated for the predicted security incident. At least one compliance policy is then evaluated to determine whether to perform a remedial action specified in the compliance policy, wherein a determination to perform the remedial action is based at least in part on the confidence score. Finally, the remedial action is performed in response to an evaluation of the at least one compliance policy.

20 Claims, 5 Drawing Sheets

AUTOMATED IDENTIFICATION OF SECURITY ISSUES

BACKGROUND

Security products, such as firewalls, endpoint detection and response (EDR) systems, user-entity behavior analytics (UEBA) systems, cloud access security brokers (CASB), and similar systems are often configured to log or report signs of potential security breaches. For example, firewalls can report attempts to access systems from unknown or unidentified sources, or repeated attempts to access a system or service from the same source. UEBA systems can report anomalous user behavior, such as unusually large data transfers, accessing systems or services at unusual times, or accessing systems or services that the user typically does not access. EDR systems can identify an unknown program acting in a suspicious manner on a client device.

When viewed individually, each anomaly could either be indicative of a security threat or a result of innocuous behavior. For example, a user unexpectedly working from home because the user is sick might register as an external connection from a previously unknown source. In this scenario, the user might also download an unusually large amount of data (e.g., project files) to work on from home. Likewise, poorly implemented device drivers might invoke system calls in a suspicious manner (e.g., a device driver for a user's personal keyboard or mouse making unnecessary system calls). However, an attacker might also register as an external connection from a previously unknown source. The attacker's malware might also be detected as an unknown program acting in a suspicious manner, with the attacker's malware also being detected by a UEBA system when it uses compromise user credentials to attempt to access and exfiltrate large amounts of data.

Typically, the anomalies are investigated by an enterprise's incident response team (IRT). The IRT often reviews the reported anomalies individually to see if they are indicative of a security problem. Likewise, the IRT can also evaluate anomalies to see if there appear to be any related anomalies. Because security products from different vendors are often incompatible, the IRT usually has to manually cross-reference anomalies to see if several anomalies are related, which can indicate that a security related incident has taken place. However, this analysis process is time-consuming and can often result in a security incident being identified and remediated after the incident has taken place instead of while the security incident is taking place.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for automating the analysis of signals or alerts provided by network and computer security devices to identify potential security issues. In some approaches, the signals or alerts are used to identify potential security issues and perform or undertake a remedial action in response. For example, the signals or alerts can be used to identify and predict the reaction that an incident response team (IRT) is most likely to perform. Various machine-learning approaches (e.g., neural networks or Bayesian networks) can be used to identify and predict the reaction of the IRT. In some implementations, the predicted response can be implemented automatically, while in other implementations, the IRT can be notified of the potential security issue and provided with a request to undertake the specified action. In the following discussion, a general description of the system and its components is provided, followed by a discussion of the operation of the same.

Figure 1:
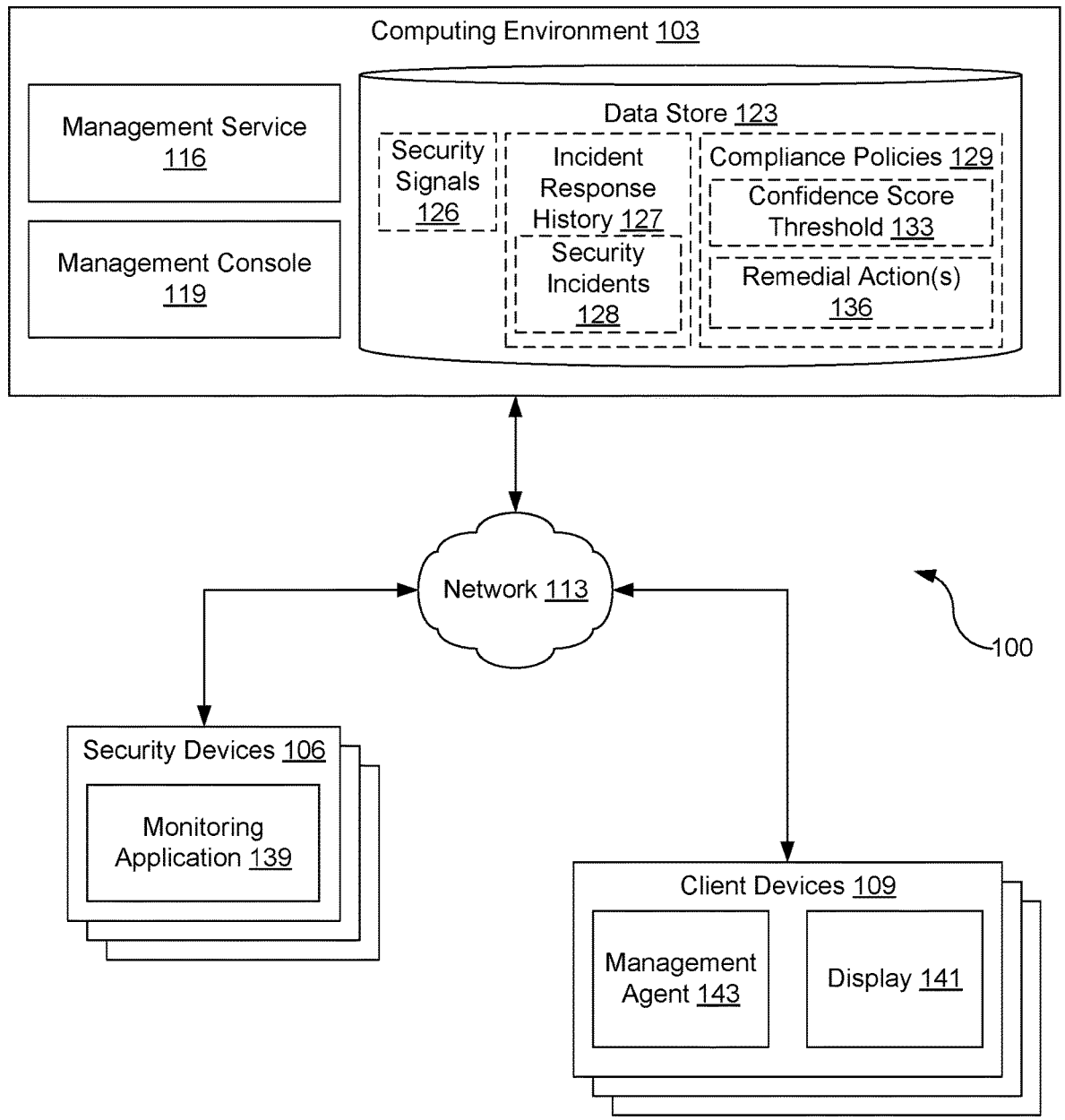
FIG. 1 is a drawing of a network environment according to various implementations of the present disclosure.

FIG. 1 depicts a network environment 100 according to various implementations. The network environment 100 includes a computing environment 103, one or more security devices 106, and one or more client devices 109, which are in data communication with each other via a network 113. The network 113 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include a server computer or any other system providing computing capability. Alternatively, the computing environment 103 can employ a plurality of computing devices that can be arranged, for example, in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various implementations. The components executed on the computing environment 103, for example, include a management service 116, a management console 119, and other applications, services, processes, systems, engines, or functionality not discussed in detail herein.

Also, various data is stored in a data store 123 that is accessible to the computing environment 103. The data store 123 can be representative of a plurality of data stores 123, which can include relational databases, object-oriented databases, hierarchical databases, hash tables or similar key-value data stores, as well as other data storage applications or data structures. The data stored in the data store 123 is associated with the operation of the various applications or functional entities described below. This data can include security signals 126, an incident response history 127, compliance policies 129, and potentially other data.

The security signals 126 represent data collected from security devices 106 and client devices 109 regarding usage of and access to network 113 resources and client devices 109. Each security signal 126 can represent a match for a predefined rule utilized by an application executing on a security device 106 or a client device 109. Although a security signal 126 can flag activity that is indicative of a security breach or security incident, equally innocuous activity can also trigger the report of a security signal 126 by a security device 106 or client device 109. Accordingly, various implementations can analyze a plurality of security signals 126 collected over time to identify patterns that may more accurately indicate that a security breach or incident is occurring.

The incident response history 127 represents a collection of security incidents 128 identified (e.g., by an incident response team) and any security signals 126 associated with a particular security incident 128. For example, a network intrusion security incident 128 can be associated with a first security signal 126 representing an unusually large number of connections from an external IP address (e.g., a brute force attack) and a second security signal 126 representing an anomalous access of resources by a user account (e.g., an attacker using a hacked user account to access computer or network resources). As another example, a ransomware security incident 128 can be associated with multiple security signals 126 generated by EDR systems installed on the client device 109 indicating an unusually high number of cryptographic operations being performed on client devices 109 by an unrecognized application that was recently installed.

A security incident 128 represents a potential security issue that was investigated and resolved by security personnel, such as members of an incident response team. Records for the security incidents 128 can, for example, be created by members of an incident response team as part of a post-mortem summary or analysis of a security incident 128 that was identified. A security incident 128 can include a record of an actual security issue that was detected and remediated by an incident response team, including any security signals 126 associated with the security incident 128 and any actions performed to resolve the issue. However, a security incident 128 can also reflect a collection of security signals 126 that result in a false alarm (e.g., where security signals 126 associated with a potential brute force attack actually reflected an employee who forgot his or her password or anomalous access to computing resources by a user is the result of new job responsibilities for the user). False positives as well as actual security threats can be stored in the incident response history to allow for the training of machine learning models utilized by the management service 116, as discussed later.

Each security incident 128 in the incident response history 127 can also include a record of the action or actions taken in response to the security incident 128. Examples of actions taken can include quarantining client devices 109 infected with malware, performing an enterprise wipe of a client device 109 to restore the client device to an uninfected state, blocking access to the network 113 on a per user or per client device 109 basis, or blocking access to particular computing devices, services, or IP addresses on a per user or per client device 109 basis. The action taken in response to a security incident can be recorded, for example, by the incident response team as part of a post-mortem summary or analysis of a security incident 128 and the response to it.

The compliance policies 129 represent triggers and responses to potential or predicted security breaches or incidents. Compliance policies 129 can be general (e.g., a compliance policy 129 for responding to ransomware infections generally) or specific (e.g., a compliance policy 129 for responding to a specific strain of ransomware). Each compliance policy 129 can specify both a confidence score threshold 133 and one or more remedial actions 136. In some implementations, a compliance policy 129 can also specify a severity score, threat category, or a vendor identifier. The severity score can represent the degree of severity of the type of security breach that the compliance policy 129 is created to address. The threat category can represent the type of security breach or incident that the compliance policy 129 is created to address. The vendor identifier can represent the vendor of the security device 106 that generated the security signal(s) 126 that lead to detection of a potential or predicted security breach or incident.

The confidence score threshold 133 can represent a confidence rating, interval or similar measure of certainty in a prediction generated by the management service 116 that a predicted security incident is actually occurring based on an analysis of one or more security signals 126. If a confidence score generated by the management service 116 for a respective prediction of a security incident is below the confidence score threshold 133, then the compliance policy 129 can be deemed to not be violated. However, if the confidence score exceeds the confidence score threshold 133, then the compliance policy 129 can be assumed to be violated.

In some implementations, a compliance policy 129 can specify multiple confidence score thresholds 133, which may be expressed as threshold ranges. For example, a simple compliance policy 129 can specify a confidence score threshold 133 of seventy percent (e.g., the management service 116 predicts that there is a seventy percent likelihood that the predicted security incident is an actual security incident), in which case a confidence score greater than seventy percent would result in the corresponding remedial action 136 specified by the compliance policy 129 being performed. However, a more complicated compliance policy 129 might specify a confidence score threshold 133 between seventy and eighty percent, a second confidence score threshold 133 between eighty and ninety percent, and a third confidence score threshold 133 above ninety percent. For each of these confidence score thresholds 133, a separate remedial action 136 might be specified, with more drastic or invasive remedial actions 136 being triggered as the management service 116 becomes more certain in the accuracy of its prediction.

The remedial action 136 specifies a type of action that can be initiated by the management service 116 if a compliance policy 129 is determined to be violated or triggered. Generally, a remedial action 136 is any action that can be performed to mitigate or negate the type of security breach or incident specified by the compliance policy 129. For example, a compliance policy 129 for monitoring unauthorized access to internal data by employees might specify a remedial action 136 that locks the user account and/or logs the user out of his or her client devices 109 automatically. As another example, a compliance policy 129 for detecting the spread of malware might specify a remedial action 136 that disconnects or blocks a potentially infected client device 109 from connecting to the network 113, initiates a factory reset or enterprise wipe of the client device 109, or places the client device 109 into a quarantine state. As a third example, a compliance policy 129 for mitigating unauthorized network access might specify a remedial action 136 to configure a firewall to block network traffic to or from an IP address (e.g., an IP address associated with a brute-force attack). Similarly, a compliance policy 129 for preventing the exfiltration or unauthorized removal of data from an enterprise network 113 can specify a remedial action 136 that blocks data transfers to a particular client device 109 or IP address. Although these examples are illustrative examples of remedial actions 136, administrative users can create or specify other types of remedial actions 136 as desired for their particular implementations.

The management service 116 can manage the operation of security devices 106 and client devices 109, as well as to analyze security signals 126 to identify predicted security incidents. The management service 116 can also determine whether any predicted security incidents violate one or more of the compliance policies 129. If a compliance policy 129 is triggered by the predicted security incident, the management service 116 can also cause one or more specified remedial actions 136 to be performed in response.

The management console 119 can provide an administrative interface for interacting with the management service 116. To provide the administrative interface, the management console 119 can include a web page or web application provided by a web server hosted in the computing environment 103. A user can interact with individual web pages, or portions of a web page, to configure compliance policies 129 or review messages generated by the management service 116 based at least in part on one or more security signals 126, as well as configure or administer individual security devices 106 or client devices 109.

The security devices 106 represent physical or virtual devices connected to the network 113 to monitor network traffic traversing, entering or exiting the network 113, as well as the behavior of client devices 109 on the network 113. For example, a security device 106 can be plugged into a switch of the network and receive a copy of all network traffic traversing the switch. As another example, a security device 106 can be placed on the edge of the network 113 at a chokepoint where all traffic must traverse the security device 106 in order to enter or exit the network. Examples of security devices 106 include firewalls, network appliances (e.g., network-based intrusion detection/prevention systems), etc.

A security device 106 can execute a monitoring application 139 to capture and analyze traffic on the network 113 and report or store security signals 126 to the data store 123.

As a first example, a firewall can have a monitoring application 139 that analyzes network traffic entering or exiting the local area network 113 (LAN) and save a security signal 126 to the data store 123 when a packet matches a predefined rule. One example would be a large number of connection attempts from a single internet protocol (IP) address in a short period of time, which could indicate a brute force attack is occurring. Another example would be connection attempts from a prohibited IP address or IP address range, which could indicate attempts by unauthorized parties to access an enterprise network. As a second example, a cloud access security broker (CASB) might detect invalid or unauthorized access attempts and store these failed access attempts as security signals 126.

The client device 109 is representative of a plurality of client devices that can be coupled to the network 113. The client devices 109 can include, processor-based computer systems such as personal computers (e.g., a desktop computer, a laptop computer, or similar device), a mobile computing devices (e.g., personal digital assistants, cellular telephones, smartphones, web pads, tablet computer systems, music players, portable game consoles, electronic book readers, and similar devices), or other devices with like capability. The client device ### can include one or more displays 141, such as liquid crystal displays (LCDs), gas plasma-based flat panel displays, organic light emitting diode (OLED) displays, electrophoretic ink ("E-ink") displays, projectors, or other types of display devices. In some instances, the display 141 can be a component of the client device 109 or can be connected to the client device 109 through a wired or wireless connection. The client device 109 can be configured to execute various applications such as a management agent 143.

The management agent 143 can be executed by the client device 109 to maintain data communication with the management service 116 and perform various actions on the client device 109 in coordination with the management service 116. For example, the management agent 143 can perform one or more remedial actions 136 on the client device 109 in response to commands provided by the management service 116. As another example, the management agent 143 can monitor the client device 109 and generate security signals 126 for storage in the data store 123.

For example, the management agent 143 can monitor applications executing on the client device 109 (e.g., the name or type of application executing, the actions being performed by the application, etc.), network resources accessed by applications executing on the client device 109 (e.g., websites visited, file servers or shares which are accessed, etc.), which user(s) are currently logged into the client device 109, etc. In some implementations, however, one or more of these functions can be performed by other applications (e.g., locally installed EDR clients, locally installed anti-virus or anti-malware applications, etc.). In these implementations, these other applications can generate and provide the security signals 126 to the management agent 143, which can in turn relay the security signals 126 to the management service 116. Alternatively, they can generate and provide the security signals 126 directly to the management service 116 or directly store the security signals 126 in the data store 123, bypassing both the management service 116 and management agent 143.

In some instances, the management agent 143 can be implemented as a separate application executing on the client device 109. In other instances, the management agent 143 can be implemented as a mobile device management (MDM) framework provided by or included in the operating system installed on the client device 109. The management agent 143 can be configured to contact the management service 116 at periodic intervals and request that the management service 116 send any commands or instructions stored in a command queue to the management agent 143, such as remedial actions 136 to be performed. The management agent 143 can then cause the client device 109 to perform the commands provided by the management service 116.

Next, a general description of the operation of the various components of the network environment 100 is provided. Although the following description provides an illustrative example of the operation of the network environment 100, more detailed descriptions of the operation of individual components are provided in the following figures.

To begin, monitoring applications 139 or management agents 143 installed on various security devices 106 or management agents 143 monitor the network 113 and client devices 109 for events that could indicate a potential security issue. The events could be predefined by a vendor that supplied the monitoring applications 139 or management agents 143 or the events could have been previously defined by an administrative user through the management console 119.

Whenever activity occurs that matches the definition of the event, a security signal 126 is stored in the data store 123. For example, the monitoring application 139 or the management agent 143 could send a security signal 126 to the management service 116, which then stores the security signals 126 in the data store 123. As another example, a monitoring application 139 or management agent 143 can store the security signals 126 that they generate in data store 123 directly in order to avoid a situation where the management service 116 becomes a bottleneck as the number of security devices 106 and client devise 109 in data communication with the computing environment 103 increase.

As security signals 126 are generated, they can be investigated by an incident response team or similar personnel. In instances where a security signal 126 is investigated, the incident response team can create a security incident 128 record in the incident response history 127. The security incident 128 can include a record of the security signal(s) 126 that resulted in an investigation by the incident response team and the result of the analysis by the incident response team.

After a sufficient number of records for security incidents 128 have been stored in the incident response history 127, the management service 116 can begin analyzing the security incidents 128 to begin training a machine learning model. The machine learning model can be implemented to allow the management service 116 to analyze future security signals 126 received from the monitoring applications 139 on security devices 106 or management agents 143 on client devices 109 to identify potential security issues and calculate a confidence score for how likely the prediction is accurate. Examples of machine learning models that can be used by the management service 116 include neural networks and Bayesian networks.

As an illustrative example, a Bayesian network could be used as a machine learning model for the management service 116. In this example, security incidents 128 might be stored in tables according to the type of security incident 128. For example, ransomware security incidents 128 could be stored in a first table, phishing security incidents 128 could be stored in a second table, etc. Within each table, a single row or record could represent a single security incident 128. Each security incident 128 could include at least three variables—an input variable XI, one or more identification variables XD, and one or more counter measure variables XC. More specifically, XI represents those security signals 126 that triggered an incident response, such as a security signal 126 where a user followed a suspicious link in a phishing security incident 128. XD represents variables that are assigned values during the investigation phase of the security incident 128, such as a Boolean variable indicating whether or not the suspicious link in a phishing security incident 128 was in fact malicious. XC represents variables that are assigned values during the countermeasure phase (e.g., was a user account disabled, was a client device 109 blocked from the network 113, was a factory or enterprise wipe performed on a client device 109, etc.). So a record of a security incident 128 could include XI, XD, and XC.

Variables such as XD and XC may be sequentially assigned, with a sequence being denoted as $XS=[XDC_1 \ldots XDC_i, \ldots XDC_n]$, where $XDC_i$ are variables from [XD, XC]. These assignments may be made at periodic intervals or in response to particular trigger events occurring.

Each security incident 128 can also include a severity value or variable, which is denoted in this illustrative example as Y. The value for Y maybe user defined or the result of a user defined function that calculates the value for Y based on the type of security incident identified (XD) and the type of countermeasures performed (XC). The variable XC may be used to calculate the severity of a security incident 128 because the type of countermeasures taken tend to reflect the severity of a security incident 128, with more aggressive or extensive countermeasures being used to contain more severe threats.

These variables can then be used to create a data model D which can be used to train a Bayesian Network to model the incident response process. Assuming that D=[XI, XD, XC, Y] where Y=f(XC), and a variable ordering constraint of $XI \rightarrow XS$ and $XDC_i \rightarrow XDC_{i+1}$, then the training data would be represented by the following matrix:

$$[XI^1, XD^1, XC^1, Y^1]$$
$$\ldots$$
$$XI^j, XD^j, XC^j, Y^j$$
$$\ldots$$
$$XI^n, XD^n, XC^n, Y^n]$$

The structure of the Bayesian network can be learned from the data model D using a score-based approach. The score-based approach can have two parts: a definition of the score metric and the search algorithm. Examples of the score metric can include a Bayesian score or a (BIC) score. An example search algorithm is the Known Order algorithm, where given the known ordering $X_1 \rightarrow X_2 \rightarrow X_3 \rightarrow \ldots \rightarrow X_N$, a structure of the Bayesian network can be learned that maximizes the score.

Parameters for the Bayesian network can be identified using various approaches. If no hidden variables within the Bayesian network are assumed, then network parameters can be learned or identified using local conditional likelihood estimation. However, other approaches for learning parameters of fully observed Bayesian networks can also be used. For example, as additional values for variables (e.g., XI, XD, and/or XC) are collected, new results (e.g. updated severity scores or confidence scores) can be computed.

As new security signals 126 are received from the monitoring applications 139 on security devices 106 or management agents 143 on client devices 109, the management service 116 will use its machine learning model to identify patterns in the security signals 126 that are similar to previously recorded security incidents 128. When a pattern of security signals 126 is identified that matches or is similar to a previously recorded security incident 128, the management service 116 can then evaluate a respective compliance policy 129 to determine the type of remedial action 136, if any that should be performed. The management service 116 can then cause the remedial action 136 specified by the compliance policy 129 to be performed.

Figure 2:
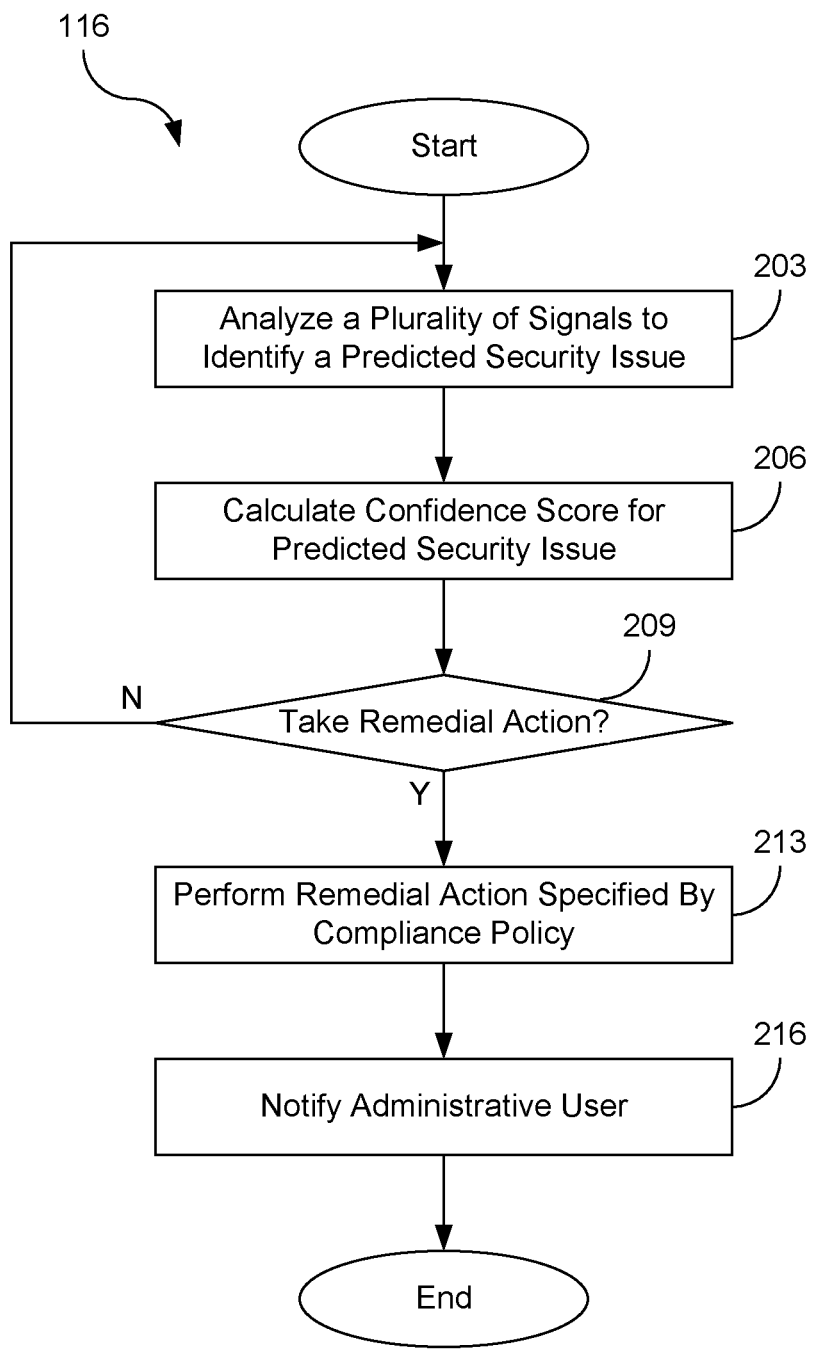
FIG. 2 is a flowchart illustrating one example of functionality implemented as portions of an application executed in a computing environment in the network environment of FIG. 1 according to various implementations of the present disclosure.

Referring next to FIG. 2, shown is a flowchart that provides one example of the operation of a portion of the management service 116 according to various implementations. It is understood that the flowchart of FIG. 2 provides merely an example of the many different types of functional arrangements that can be employed to implement the operation of the portion of the management service 116. As an alternative, the flowchart of FIG. 2 can be viewed as depicting an example of elements of a method implemented in the computing environment 103 according to one or more implementations.

Beginning at step 203, the management service 116 can analyze a plurality of security signals 126 as they are received from the monitoring applications 139 or management agents 143 executing on security devices 106 and client devices 109 connected to the network 113 in order to predict whether a potential security issue is an actual security issue. For example, as security signals 126 are received, they may be fed into a machine learning model (e.g., a neural network or Bayesian network). The machine learning model of the management service 116 can then compare patterns identified from the security signals 126 with security signals 126 associated with previously recorded security incidents 128 stored in the incident response history 128. If a pattern among the received security signals 126 is sufficiently similar to the collection of security signals 128 associated with a previous security incident 128 or type of security incident 128, then the management service 116 can flag those received security signals 126 as indicating a potential security issue.

Then at step 206, the management service 116 can calculate a confidence score representing the certainty or likelihood that the potential security issue is an actual security issue (e.g., that a potential network intrusion is an actual network intrusion or that a potential insider attack is an actual insider attack). The confidence score can be calculated using a variety of approaches. For example, the confidence score could be calculated using statistical approaches for calculating confidence intervals. As another example, the confidence score could be calculated as a ratio representing the amount or degree of overlap between the number and type of security signals 126 representing a possible or potential security issue and a previously identified security incident 128. As a third example, the confidence score could be calculated as a ratio representing the number of security incidents 128 with the same or similar security signals 126 that were actual security issues versus the total number of security incidents 128 with the same or similar security signals 126. For instance if there are one-hundred security incidents 128 that have the same number and type of security signals 126 associated with them as a potential security issue that has been identified by the management service 116, but five of those security incidents 128 were false positives, then a confidence score would be 95%.

In some implementations, the management service 116 can also calculate a severity score for the potential security issue. For example, the management service 116 may determine with a confidence score of 95% that the that a potential security issue is a low severity security issue. Examples of severity scores or ratings can include numeric values or relative values such as "none," "low," "medium," or "high." If the severity score is "none" (or equivalent in another ranking or rating system), then this could indicate that the potential security issue is a false positive.

Next at step 209, the management service 116 can determine whether a remedial action 136 specified in a compliance policy 129 should be performed. For example, the management service 116 can compare the confidence score calculated previously at step 206 with a confidence score threshold 133 in an applicable compliance policy 129. If the confidence score meets or exceeds the confidence score threshold 133, then the management service 116 can determine that a respective remedial action should be performed.

The applicable compliance policy 129 can be identified by the management service 116 at step 209 using any of several potential approaches. For example, the compliance policy 129 can specify one or more security signals 126 that, if observed, would indicate a violation of the compliance policy 129. In instances where multiple security signals 126 are specified, the compliance policy 129 might further specify that the security signals 126 be observed within a predefined window of time (e.g., within a one-hour, twenty-four hour, or one week period, etc.). If the management service 116 identifies one or more security signals 126 that match the pattern defined by the compliance policy 129, then the management service 116 can select the compliance policy 219 at step 209.

Subsequently at step 213, the management service 116 can cause the remedial action 136 specified in the compliance policy 129 to be performed. For instance, the management service 116 can send a message to a monitoring application 139 or a management agent 143 to cause a security device 106 or client device 109 to perform the remedial action 136. For example, if the remedial action 136 specified blocking a client device 109 from accessing the network 113, then the management service 116 might send a message to the monitoring application 139 of a security device 106 (e.g., a firewall) to create a new rule that blocks all traffic on the network 113 from reaching the client device 109. Similarly, the management service 116 might send a message to a management agent 143 on the client device 109 to disable any network interfaces of the client device 109. As another example, if the remedial action 136 specified performing an enterprise wipe of the client device 109, the management service 116 could send a message to the management agent 143 on the client device 109 to cause the client device 109 to reboot and revert the state of the client device 109 to an earlier, uncompromised state (e.g., the state of the client device 109 at which it left the factory).

Finally, at step 216, the management service 116 can send a notification to an administrative user that the remedial action 136 was performed. For example, the management service 116 can send the notification to a client device 109 of the administrative user (e.g., an email, an SMS message, or other push notification or message). As another example, the management service 116 can send the notification to the management console 119 to present to the administrative user the next time the administrative user accesses or otherwise uses the management console 119.

Figure 3:
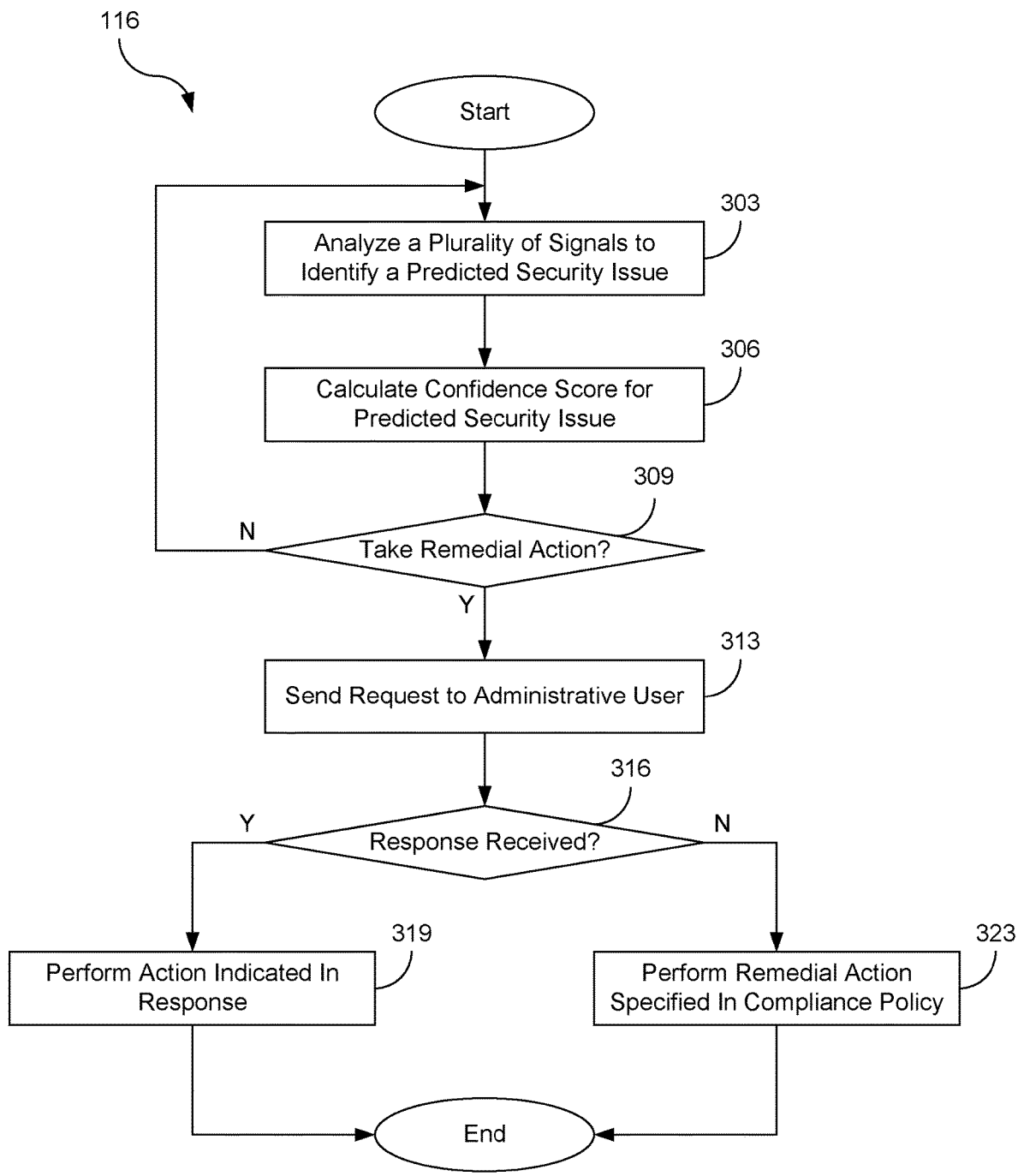
FIG. 3 is a flowchart illustrating one example of functionality implemented as portions of an application executed in a computing environment in the network environment of FIG. 1 according to various implementations of the present disclosure.

Referring next to FIG. 3, shown is a flowchart that provides another example of the operation of a portion of the management service 116 according to various implementations. It is understood that the flowchart of FIG. 3 provides merely an example of the many different types of functional arrangements that can be employed to implement the operation of the portion of the management service 116. As an alternative, the flowchart of FIG. 3 can be viewed as depicting an example of elements of a method implemented in the computing environment 103 according to one or more implementations.

Beginning at step 303, the management service 116 can analyze a plurality of security signals 126 as they are received from the monitoring applications 139 or management agents 143 executing on security devices 106 and client devices 109 connected to the network 113 in order to predict whether a potential security issue is an actual security issue. This analysis can be performed in the same or similar manner as previously described with respect to step 203 in FIG. 2.

Then at step 306, the management service 116 can calculate a confidence score representing the certainty or likelihood that the potential security issue is an actual security issue. This confidence score can be calculated in the same or a similar manner as previously described with respect to step 206 in FIG. 2.

Next at step 309, the management service 116 can determine whether a remedial action 136 specified in a compliance policy 129 should be performed. This determination can be made in the same or a similar manner as previously described with respect to step 209 in FIG. 2.

Moving on to step 313, the management service 116 can send a request to an administrative user (e.g., a system administrator, a member of an incident response team, etc.) to review the predicted security issue identified at step 303 and confirm that the remedial action 136 should be performed. For example, the management service 116 can send the request as a message to a client device 109 of the administrative user (e.g., an email, an SMS message, or other push notification or message). As another example, the management service 116 can send the request to the management console 119 to present to the administrative user the next time the administrative user accesses or otherwise uses the management console 119.

The message or request sent at step 313 can include a number of options. For example, the request can ask the administrative user to confirm that the remedial action 136 should be performed or ask the administrative user to instruct to select an option that the management service 116 not perform the remedial action 136. In some instances, the message or request sent at step 313 can include a list of several possible remedial actions 136 that could be performed (e.g., where several compliance policies 129 are violated), and the administrative user could be asked to select one or more of the possible remedial actions 136 to be performed.

Then at step 316, the management service 116 can determine whether a response is received. For example, the management service 116 can wait a predefined amount of time (e.g., a timeout period) to receive a response from the administrative user. If no response is received in the predefined amount of time, the process proceeds to step 319. If a response is received, then the process proceeds to step 323. The length of the predefined amount of time can vary based on the severity of the predicted security issue or the confidence score for the predicted security issue. For example, the compliance policy 129 can specify the length of the predefined amount of time, with compliance policies 129 for more severe security threats setting shorter amounts of time or compliance policies 129 specifying shorter amounts of time when the confidence score is high and longer amounts of time when the confidence score is low.

If a response is received at step 316, then at step 319 the management service 116 can analyze the response to determine what kind of remedial action 136 should be performed. For example, if the administrative user was presented at step 313 with a choice of several potential remedial action 136 that could be performed, then remedial action 136 that was selected by the administrative user could be initiated by the management service 116. As another example, if the administrative user confirmed the recommendation provided by the management service 116 in the message sent at step 313, then the management service 116 could proceed with the recommended remedial action 136. Finally, if the reply indicated that the administrative user did not want any remedial action 136 to be performed, then no action might be taken.

However, if the process proceeds to step 323 because no response is received from the administrative user, then the management service 116 can cause the remedial action 136 identified in the compliance policy 129 to be performed. This can be done, for example, in order to minimize the impact of a security breach by intervening early.

Figure 4:
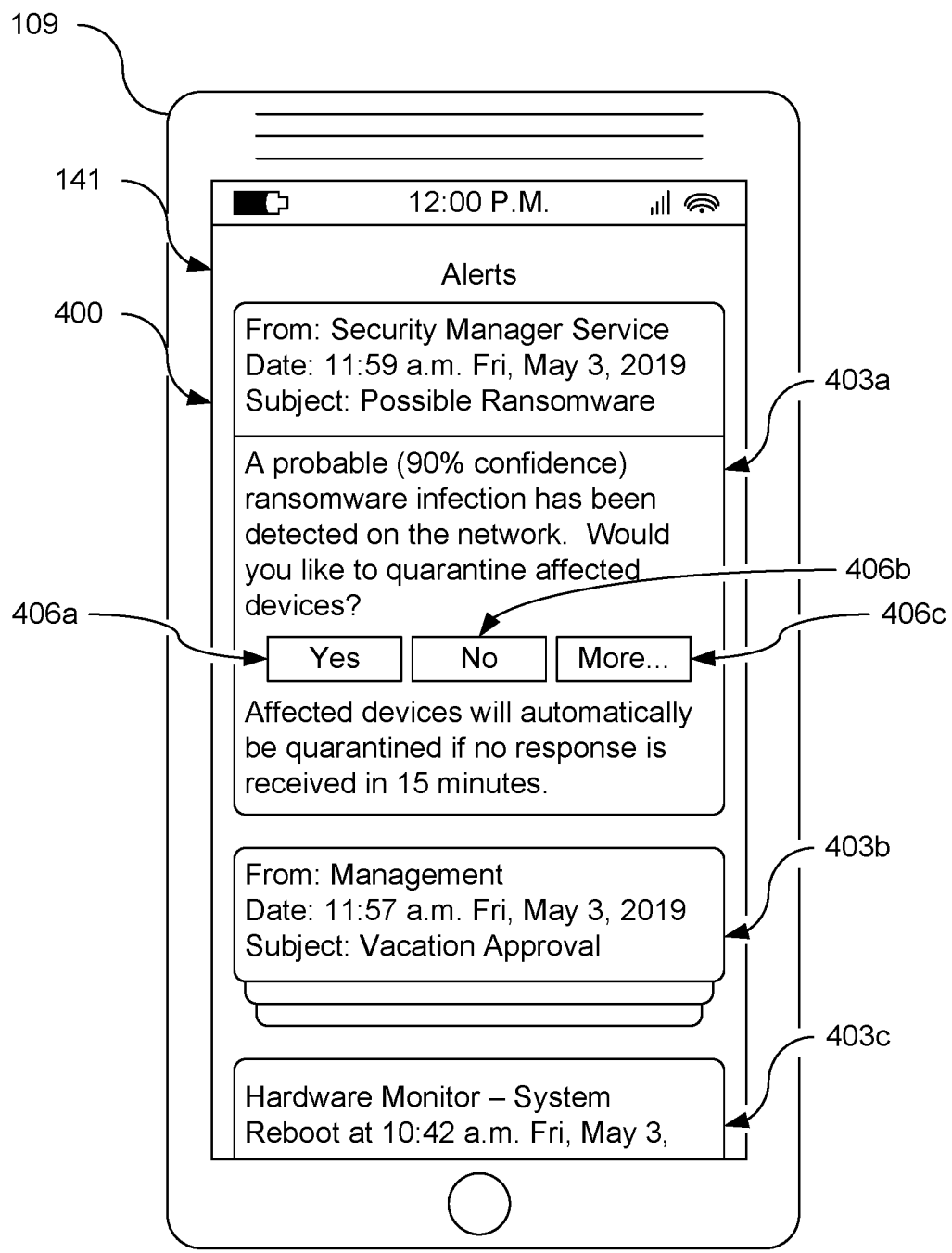
FIG. 4 is an example of a user interface rendered on a client device operating in the network environment of FIG. 1 according to various implementations of the present disclosure.

Moving on to FIG. 4, shown is a user interface 400 rendered on a display 141 of a client device 109, such as a smartphone or similar mobile device assigned to or operated by an administrative user. The user interface 400 may represent a dashboard, message or notifications screen, or similar user interface. Accordingly, the user interface 400 can include a number of notifications 403a, 403b, and 403c (collectively the "notifications 403") received from various applications or services, such as the management service 116. For example, the management agent 143 can cause a notification 403a to be rendered in response to receiving a message from the management service 116 indicating detection of a potential security issue (e.g., a ransomware attack) by the management service 116. The notification 403a could include one or more user interface elements 406a, 406b, 406c (collectively the "user interface elements 406"), which may allow an administrative user to respond to the notification 403a. For example, a first user interface element 406a can allow for the administrative user to explicitly authorize that the suggested remedial action 136 be performed. A second user interface element 406b can allow for the administrative user to explicitly prohibit performance of the suggested remedial action 136. A third user interface element 406c may allow for the administrative user to receive more detailed information about the potential security issue, such as the security signals 126 that triggered the alert, in order to decide whether to allow the proposed remedial action 136 to be performed.

Figure 5:
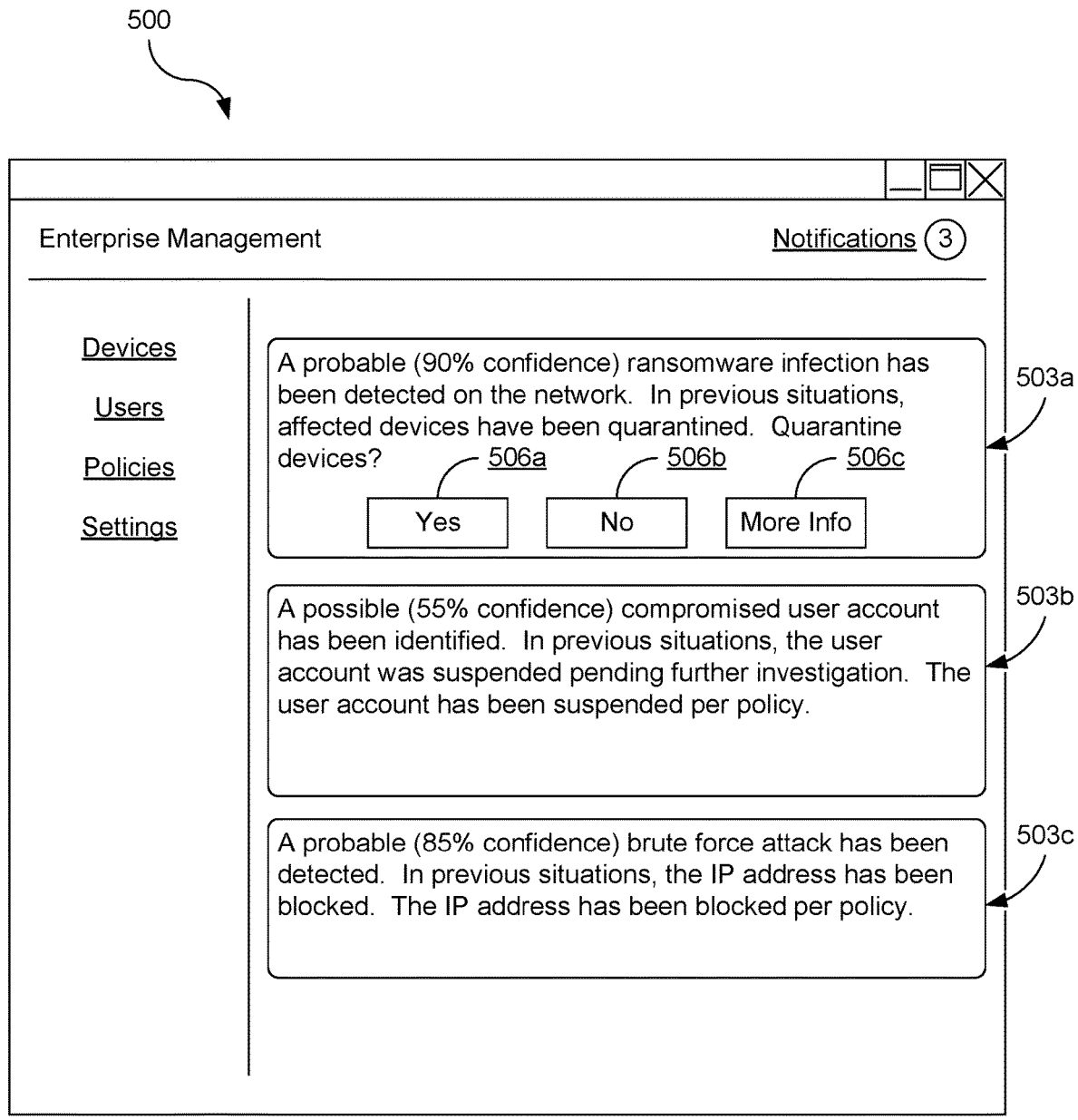
FIG. 5 is another example of a user interface rendered on a client device operating in the network environment of FIG. 1 according to various implementations of the present disclosure.

Proceeding to FIG. 5, shown is an example of a user interface 500 rendered on a display 141 of a client device 109, such as a smartphone or similar mobile device assigned to or operated by an administrative user. The user interface 500 (e.g., a web page) can be generated by the management console 119 in response to a request by a web browser operating on the client device 109. The user interface 500 may include a number of notifications 503, such as notifications 503a, 503b, and 503c. These notifications 503 can be presented within the user interface 500 when the user accesses the management console 119 in order to alert the administrative user to the management service 116 detecting a potential security issue. A notification 503, as illustrated by notification 503a, may also include one or more user interface elements 506, such as user interface elements 506a, 506, and 506c, which may allow for the administrative user to respond to the notification. For example, a user interface element 506a might allow for a user to approve of the recommended remedial action 136, prohibit the remedial action 136 from being performed, or request more information on the potential security issue. However, some notifications 503, such as notifications 503b and 503c, may instead include a message indicating that a remedial action 136 has already been performed, such as a remedial action 136 specified in a compliance policy 129.

Although the management service 116, management console 119, monitoring application 139, management agent 143, and other various systems described herein can be implemented in software or code executed by general-purpose hardware as discussed above. The same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show examples of the functionality and operation of various implementations of portions of components described in this application. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The non-transitory computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefor, we claim:

1. A system, comprising:
    a computing device comprising a processor device and a memory; and
    machine-readable instructions stored in the memory that, when executed by the processor device, cause the computing device to at least:
        analyze a plurality of signals received from a plurality of security devices to identify a predicted network security incident associated with a network based on a machine learning model identifying a pattern among the plurality of signals that corresponds to a previous network security incident, each of the plurality of signals indicating a potential network security issue, the plurality of security devices generating the plurality of signals based on monitoring network traffic on the network;
        calculate a confidence score for the predicted network security incident, the confidence score representing an accuracy of a precision of the predicted network security incident;
        evaluate at lease one compliance policy to determine whether to perform a remedial action specified in the at least one compliance policy, wherein a determination to perform the remedial action is based at least in part on the confidence score exceeding a confidence threshold specified by the at least one compliance policy; and
        direct the plurality of security devices to perform the remedial action in response to an evaluation of the at least one compliance policy.

2. The system of claim 1, wherein the machine-readable instructions that cause the computing device to direct the plurality of security devices to perform the remedial action further cause the computing device to at least send a message to a client device associated with an administrative user, the message comprising a summary of the predicted network security incident, the confidence score, and the remedial action.

3. The system of claim 2, wherein the machine-readable instructions that cause the computing device to direct the plurality of security devices to perform the remedial action further cause the computing device to at least direct the plurality of security devices to perform the remedial action in response to a reply received from the client device associated with the administrative user.

4. The system of claim 2, wherein the machine-readable instructions that cause the computing device to direct the plurality of security devices to perform the remedial action further cause the computing device to at least direct the plurality of security devices to perform the remedial action in response to a failure to receive a reply from the client device associated with the administrative user within a predefined period of time.

5. The system of claim 1, wherein the machine-readable instructions that analyze the plurality of signals to identify the predicted network security incident implement a Bayesian network to identify the predicted network security incident.

6. The system of claim 1, wherein the remedial action specified in the at least one compliance policy indicates that at least one client device is to be blocked from accessing the network.

7. The system of claim 1, wherein the plurality of signals are stored in a data store accessible to the computing device.

8. A method, comprising:
analyzing a plurality of signals received from a plurality of security devices to identify a predicted network security incident associated with a network based on a machine learning model identifying a pattern among the plurality of signals that corresponds to a previous network security incident, each of the plurality of signals indicating a potential network security issue, the plurality of security devices generating the plurality of signals based on monitoring network traffic on the network;
calculating a confidence score for the predicted network security incident, the confidence score represented an accuracy of a prediction of the predicted network security incident;
evaluating at lease one compliance policy to determine whether to perform a remedial action specified in the at least one compliance policy, wherein a determination to perform the remedial action is based at least in part on the confidence score exceeding a confidence threshold specified by the at least one compliance policy; and
directing the plurality of security devices to perform the remedial action in response to an evaluation of the at least one compliance policy.

9. The method of claim 8, wherein directing the plurality of security devices to perform the remedial action further comprises sending a message to a client device associated with an administrative user, the message comprising a summary of the predicted network security incident, the confidence score, and the remedial action.

10. The method of claim 9, wherein directing the plurality of security devices to perform the remedial action occurs in response to a reply received from the client device associated with the administrative user.

11. The method of claim 9, wherein directing the plurality of security devices to perform the remedial action occurs in response to a failure to receive a reply from the client device associated with the administrative user within a predefined period of time.

12. The method of claim 8, wherein the predicted network security incident is identified using a Bayesian network.

13. The method of claim 8, wherein the remedial action specified in the at least one compliance policy indicates that at least one client device is to be blocked from accessing the network.

14. The method of claim 8, wherein the plurality of signals are stored in a data store.

15. A non-transitory, computer-readable medium comprising machine-readable instructions that, when executed by a processor device, cause a computing device to at least:
analyze a plurality of signals received from a plurality of security devices to identify a predicted network security incident associated with a network based on a machine learning model identifying a pattern among the plurality of signals that corresponds to a previous network security incident, each of the plurality of signals indicating a potential network security issue, the plurality of security devices generating the plurality of signals based on monitoring network traffic on the network;
calculate a confidence score for the predicted network security incident, the confidence score represented an accuracy of a prediction of the predicted network security incident;
evaluate at lease one compliance policy to determine whether to perform a remedial action specified in the at least one compliance policy, wherein a determination to perform the remedial action is based at least in part on the confidence score exceeding a confidence threshold specified by the at least one compliance policy; and
direct the plurality of security devices to perform the remedial action in response to an evaluation of the at least one compliance policy.

16. The non-transitory, computer-readable medium of claim 15, wherein the machine-readable instructions that cause the computing device to direct the plurality of security devices to perform the remedial action further cause the computing device to at least send a message to a client device associated with an administrative user, the message comprising a summary of the predicted network security incident, the confidence score, and the remedial action.

17. The non-transitory, computer-readable medium of claim 16, wherein the machine-readable instructions that cause the computing device to direct the plurality of security devices to perform the remedial action further cause the computing device to at least direct the plurality of security devices to perform the remedial action in response to a reply received from the client device associated with the administrative user.

18. The non-transitory, computer-readable medium of claim 16, wherein the machine-readable instructions that cause the computing device to direct the plurality of security devices to perform the remedial action further cause the computing device to at least direct the plurality of security devices to perform the remedial action in response to a failure to receive a reply from the client device associated with the administrative user within a predefined period of time.

19. The non-transitory, computer-readable medium of claim 15, wherein the machine-readable instructions that analyze the plurality of signals to identify the predicted network security incident implement a Bayesian network to identify the predicted network security incident.

20. The non-transitory, computer-readable medium of claim 15, wherein the plurality of signals are stored in a data store accessible to the computing device.

* * * * *